US010066872B2

(12) United States Patent
Nielsen (10) Patent No.: US 10,066,872 B2
(45) Date of Patent: Sep. 4, 2018

(54) AIR DISPERSER FOR SPRAY-DRYING, AND A METHOD FOR MANUFACTURING AN AIR DISPERSER COMPRISING METAL FORMING

(71) Applicant: GEA Process Engineering A/S, Søborg (DK)

(72) Inventor: Kent Lückstädt Nielsen, Solrød Strand (DK)

(73) Assignee: GEA Process Engineering A/S (DK)

( * ) Notice: Subject to any disclaimer, the term of this patent is extended or adjusted under 35 U.S.C. 154(b) by 0 days.

(21) Appl. No.: 15/315,958

(22) PCT Filed: Jun. 4, 2014

(86) PCT No.: PCT/DK2014/050160
§ 371 (c)(1),
(2) Date: Dec. 2, 2016

(87) PCT Pub. No.: WO2015/185060
PCT Pub. Date: Dec. 10, 2015

(65) Prior Publication Data

US 2017/0097190 A1 Apr. 6, 2017

(51) Int. Cl.

| | |
|---|---|
| *F26B 21/00* | (2006.01) |
| *F26B 3/12* | (2006.01) |
| *B05B 1/26* | (2006.01) |
| *B01D 1/18* | (2006.01) |
| *F26B 21/14* | (2006.01) |
| *B21D 22/14* | (2006.01) |

(52) U.S. Cl.
CPC .............. *F26B 21/004* (2013.01); *B01D 1/18* (2013.01); *B05B 1/26* (2013.01); *B21D 22/14* (2013.01); *F26B 3/12* (2013.01); *F26B 21/14* (2013.01)

(58) Field of Classification Search
CPC .. B01D 1/18; B05B 1/26; B21D 22/14; F26B 3/12; F26B 21/004; F26B 21/14
USPC ........................................ 261/78.2, 79.2, 116
See application file for complete search history.

(56) References Cited

U.S. PATENT DOCUMENTS

| | | | | |
|---|---|---|---|---|
| 3,803,723 A * | 4/1974 | Lamm | F26B 3/12 159/4.2 |
| 4,226,603 A * | 10/1980 | Larsson | B01D 1/18 159/4.2 |
| 4,227,896 A | 10/1980 | Larsson et al. | |
| 4,481,171 A * | 11/1984 | Baran | F23J 15/02 159/4.02 |

(Continued)

FOREIGN PATENT DOCUMENTS

| | | |
|---|---|---|
| GB | 2 302 832 A | 2/1997 |
| JP | 5-22025 U | 3/1993 |

(Continued)

*Primary Examiner* — Charles Bushey
(74) *Attorney, Agent, or Firm* — Condo Roccia Koptiw LLP

(57) ABSTRACT

In the air disperser (4) having a number of components including a top, a bottom and an outer circumferential wall forming a space (45) defined within an inner radius and an outer radius and having an air inlet (81), a set of guide vanes (7), and an air outlet (82) at the inner radius adapted to be positioned above a feed outlet from atomizing means, at least some of the components are formed by precision metal forming such as metal spinning.

16 Claims, 5 Drawing Sheets

(56) References Cited

U.S. PATENT DOCUMENTS

| | | | |
|---|---|---|---|
| 4,530,822 A * | 7/1985 | Ashley | B01D 53/48 |
| | | | 422/169 |
| 4,571,311 A * | 2/1986 | Ferguson, Jr. | B01F 5/0057 |
| | | | 159/4.01 |
| 4,619,404 A * | 10/1986 | Rasmussen | B05B 7/0075 |
| | | | 239/424 |
| 5,102,329 A | 4/1992 | Lifshits | |
| 5,227,018 A | 7/1993 | Bro et al. | |
| 8,157,249 B2 * | 4/2012 | Hansen | B01D 1/18 |
| | | | 261/78.2 |
| 8,741,035 B2 * | 6/2014 | Jacobsen | B01D 45/12 |
| | | | 95/219 |
| 2011/0139004 A1 * | 6/2011 | Jacobsen | B01D 45/12 |
| | | | 95/216 |
| 2011/0286840 A1 | 11/2011 | Bissell et al. | |
| 2013/0015264 A1 * | 1/2013 | Bazergui | B01D 1/18 |
| | | | 239/240 |

FOREIGN PATENT DOCUMENTS

| | | |
|---|---|---|
| JP | 5-504090 A | 7/1993 |
| JP | 2008-111376 A | 5/2008 |
| JP | 2012-516974 A | 7/2012 |
| WO | WO 1991/004776 A1 | 4/1991 |
| WO | WO 2007/071238 A1 | 12/2005 |

* cited by examiner

AIR DISPERSER FOR SPRAY-DRYING, AND A METHOD FOR MANUFACTURING AN AIR DISPERSER COMPRISING METAL FORMING

CROSS REFERENCE TO RELATED APPLICATIONS

This application is the National Stage Entry under 35 U.S.C. § 371 of Patent Cooperation Treaty Application No. PCT/DK2014/050160, filed 4 Jun. 2014 the contents of which are hereby incorporated by reference herein.

FIELD OF THE INVENTION

The present invention relates to an air disperser for a spray drying apparatus, comprising a number of components including a top, a bottom and an outer circumferential wall forming a space defined within an inner radius and an outer radius and having an air inlet, a set of guide vanes, and an air outlet at said inner radius adapted to be positioned above a feed outlet from atomizing means. The invention furthermore relates to a method for improving the flow of drying air in a spray drying apparatus.

BACKGROUND OF THE INVENTION

In general, spray drying may be performed in many ways, and to all varieties it applies that the air distribution in the spray drying apparatus is one of the most vital parts. There are various systems depending on the plant design and the type of product to be produced. Different designs or adjustment of air dispersers are used in spray dryers to achieve either roughly a straight "plug-flow" air stream or a swirling air stream. The most common is that the air disperser is situated on top of the spray dryer ceiling, and the atomizing device(s) is/are placed at the middle of the air disperser thus ensuring an optimal mixing of the air and the atomized droplets.

Such air dispersers are provided in a variety of sizes and are traditionally manufactured by the use of assembly techniques including welding of components that are typically cut, cast, die-cast or formed by bending. Thus, a relatively large number of components need to be handled and connected to each other. The components include a set of guide vanes to be arranged in a guide vane framework which in turn is mounted in the space formed as a bowl-shaped structure to provide the distribution of drying air inside of the air disperser. Examples of prior art air dispersers incorporating such a framework are U.S. Pat. No. 4,227,896 (Niro) and WO 2007/071238 A1 (Niro). The guide vanes are normally welded to a nearby part or parts of the air disperser.

Although these air dispersers provide for reliable operation, the manner of manufacturing the air disperser is relatively cumbersome and entails some disadvantages due to in particular the assembly. In addition to the resources expenses, the manufacture of the individual components, each with a particular tolerance, and the subsequent assembly including the welding necessarily entail that deviations from a model configuration and from one air disperser to the other occur. In turn, the deviations lead to variations in the flow of drying air. This is particularly pronounced in smaller spray drying apparatus, in which the dimensions of the air disperser are small, and where the relative accumulated tolerances in apparatus manufactured by traditional techniques may be substantial.

SUMMARY OF THE INVENTION

It is an object of the invention to provide an air disperser for a spray drying apparatus, in which the conditions of manufacture and operation are improved.

In a first aspect, this and further objects are achieved by the provision of an air disperser of the kind mentioned in the introduction, which is furthermore characterized in that at least some of said components is formed by precision metal forming.

The invention is based on the recognition that an improved reliability in the quality of the product is achieved by the increased accuracy and predictability in the configuration of the air disperser, which is the result of providing at least some portions of the base module by precision metal forming, Thus, the tendency of deviations of the flow of drying air is reduced, thus eliminating or at least reducing the risk of product deposits emanating from an asymmetric flow, which in turn could affect the quality of the dried product. The air disperser according to the invention may be manufactured with a high degree of predictability, and the reproducibility in the configuration entails that the variations between individual air dispersers are substantially lower than in prior art devices including manufacture and assembly of a larger number of components. This, in turn, compensates for the larger investment in tools and machinery required by the precision metal forming as compared to the traditional manufacture and assembly. The advantages obtained by the present invention are particularly pronounced in smaller spray drying plants.

By the term "air disperser" as used herein is meant any disperser supplied with a drying gas to be used in the spray dryer. A skilled person will know that air is often used as the drying gas when the liquid to be atomized is an aqueous solution, while an inert gas, such as e.g. nitrogen, is more likely used, when the liquid to be atomized is a non-aqueous solution or oxidation of the product must be avoided. Consequently, the term "drying air" covers all types of drying gas, which may be used in the spray drying process. Additionally, the term "spray drying" should be interpreted as embracing any process including drying, cooling and conditioning of a feed.

In one preferred embodiment, said components include at least the bottom and outer wall of said space, and the bottom and outer wall of said space are provided by a base module formed as a double-walled unit comprising a lower portion and an upper portion, and wherein the lower portion and upper portion being formed by precision metal forming.

The precision metal forming may in principle be chosen from any type rendering it possible to obtain the required accuracy and hence improved flow of drying air. In a further development of the preferred embodiment, each of the lower portion and the upper portion are formed by metal spinning.

Metal spinning typically does not have the versatility of other metal forming techniques, such as deep drawing or pressing. Due to the nature of the process, metal spinning cannot create irregular shapes; however, for bell-shaped, spherical, and tubular forms, metal spinning is often highly cost-efficient. This is not a result of the high fixed cost of metal spinning, but of the relatively low variable costs. Due to the nature of metal spinning, an absolutely rotational-symmetric item is produced, which is of great importance for the object in question.

The connection between the lower portion and the upper portion may in principle be carried out in any suitable manner, but are in a preferred development connected to each other by means of at least one connecting element formed by a metal plate curved to the appropriate curvature. The connecting element thus functions as an enveloping portion of the air disperser.

Other components to be formed by precision metal forming may include the top, and the top is advantageously provided by a top plate, optionally a two-part top plate. The top plate is, in a preferred further development, formed by metal spinning.

In a second aspect, a method for improving the flow of drying air in a spray drying apparatus.

Further details and advantages will appear from the detailed description and appended claims.

BRIEF DESCRIPTION OF THE DRAWINGS

In the following, the invention will be described in further detail by means of the following description of preferred embodiments and with reference to the drawings, in which.

DETAILED DESCRIPTION OF THE INVENTION AND OF PREFERRED EMBODIMENTS

Figure 1:
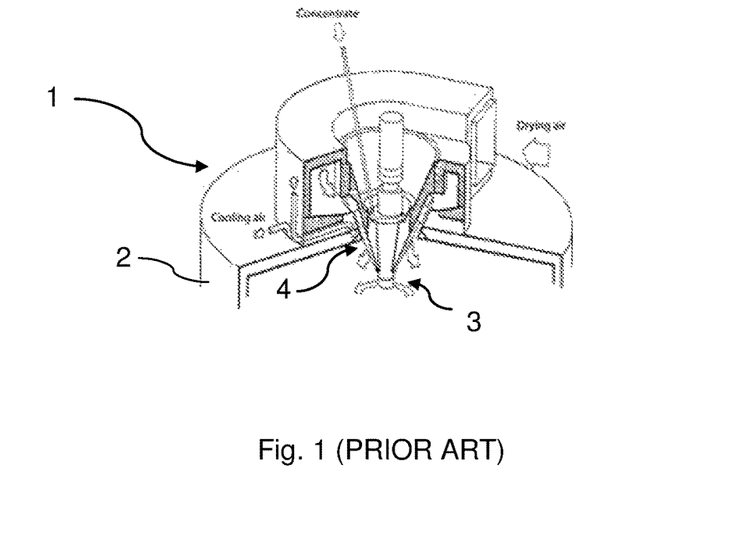
FIG. 1 shows a partial perspective and sectional view of a prior art air disperser mounted in the ceiling of a spray drying apparatus.
Figure 2:
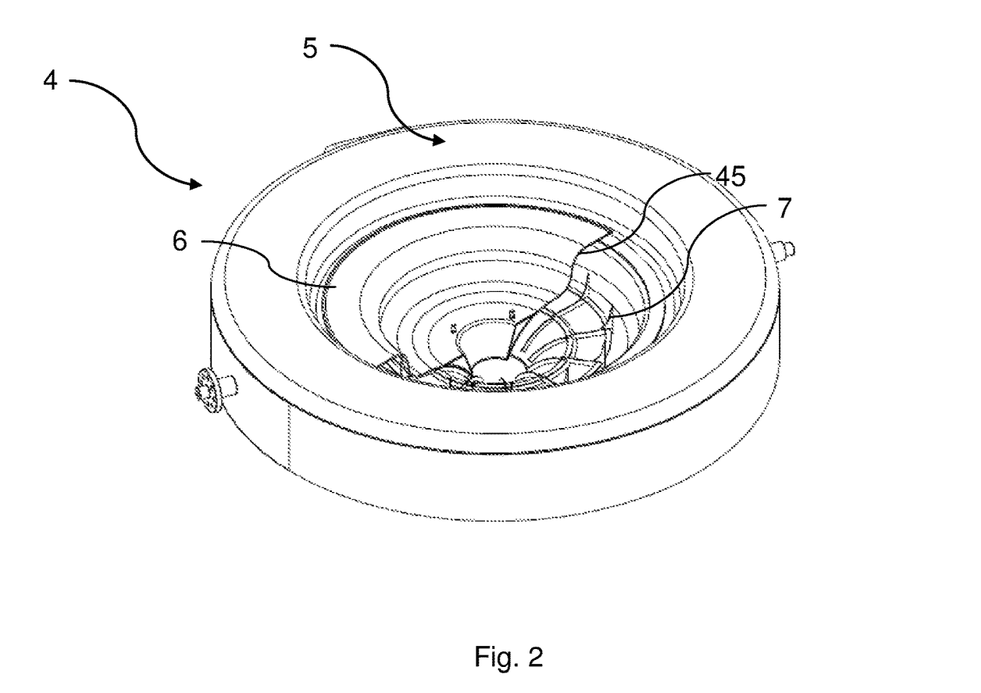
FIGS. 2 and 3 show partial perspective and sectional views of an air disperser in a first embodiment of the invention.
Figure 3:
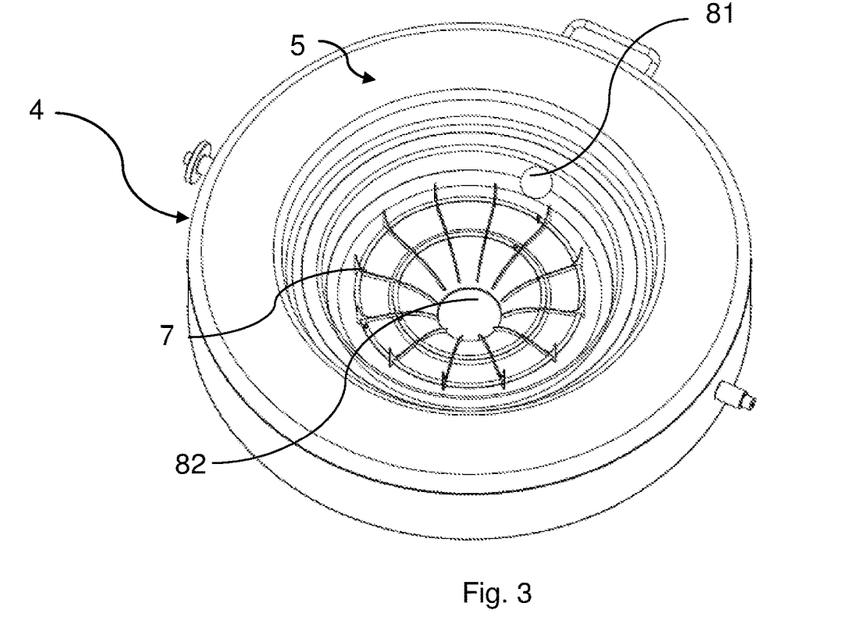
Figure 4:
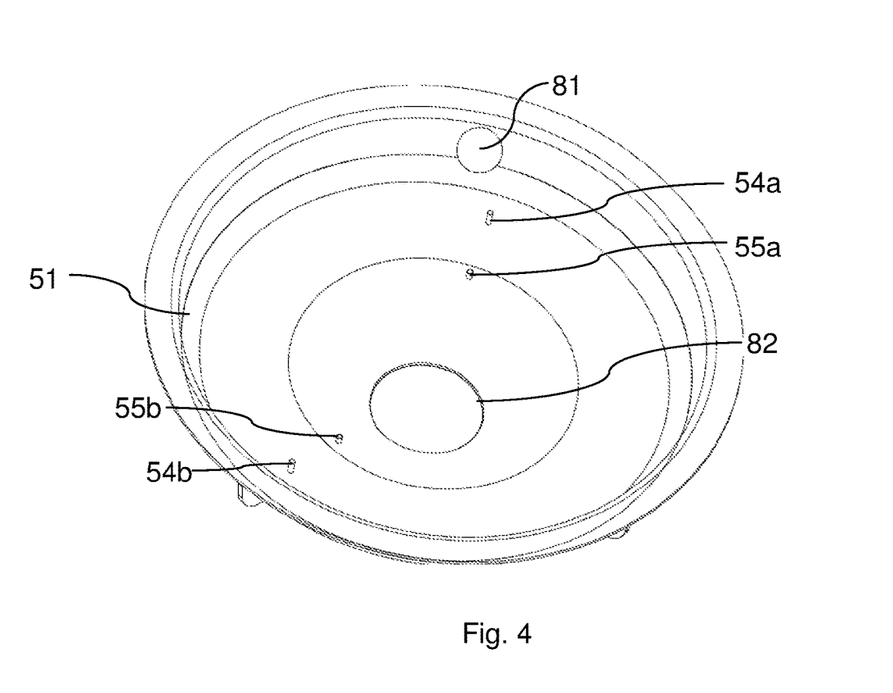
FIG. 4 is a perspective view of a detail of the air disperser shown in FIGS. 2 and 3.

In FIG. 1, relevant parts of the top of a prior art spray drying apparatus generally designated 1 are shown. The spray drying apparatus 1 comprises a drying chamber 2 to which a feed to be spray dried is introduced at the top thereof by means of suitable atomizing means 3 and is set into a, possibly swirling, downward movement in the drying chamber 2 by drying air introduced via an air disperser generally designated 4 mounted at the ceiling of the drying chamber 2 of the spray drying apparatus. The spray drying apparatus may for instance form part of a spray drying plant in which further components are present, in which the drying process and other processes associated with the drying of materials are carried out.

Referring now to FIGS. 2 to 10, a first embodiment of an air disperser designated 4 according to the present invention will be described in some detail. It is noted that parts of a spray drying apparatus, in which the air disperser according to the invention is adapted to be built into, may correspond to those of the prior art apparatus, but may also vary in some details.

Figure 6:
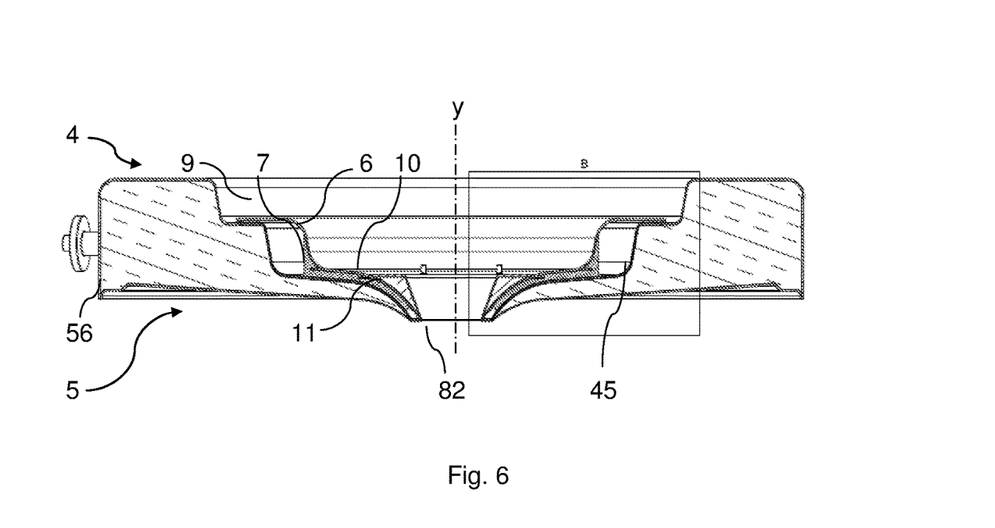
FIG. 6 is a sectional view, on a larger scale, of the air disperser of FIG. 5, along the line A-A.
Figure 7:
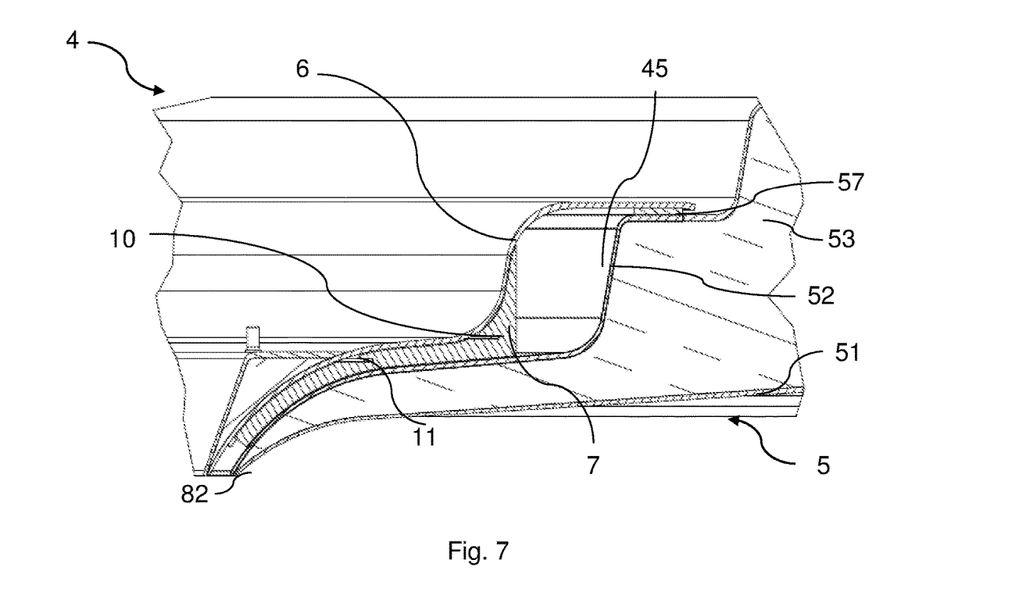
FIG. 7 is a partial sectional view, on a still larger scale, of section B of FIG. 6.

The air disperser 4 has a longitudinal axis defining an axial direction and a radial direction extending perpendicularly to the axial direction. The axial direction y is indicated in FIG. 6. The air disperser is connected to a supply of drying air or gas, in the embodiment shown via a separate air inlet part 8, and has an air inlet 81 leading to a space 45 defined within an inner radius and an outer radius. The space 45 is, as shown most clearly in FIG. 2, delimited by a top, a bottom and an outer circumferential wall. In the embodiment shown, the top is provided by top plate 6 and the bottom and the outer wall by a base module 5 constructed as will be described in further detail below. A set of guide vanes 7 is positioned within the space 45. An air outlet 82 is present at the inner radius and, in the mounted condition, surrounds a feed outlet of atomizing means such as a nozzle or a rotary atomizer.

Details regarding the configuration of the guide vanes 7 are described in Applicant's co-pending application on the same date as the present application.

In the embodiment shown in FIGS. 2 to 8, the base module 5 is formed as a double-walled unit comprising a lower portion 51 and an upper portion 52, and wherein the bottom and outer wall of space 45 are formed by the upper portion 52. As shown most clearly in the detailed view of FIG. 6, the air disperser is provided with an insulating material 53 inserted between the lower portion 51 and the upper portion 52.

At the periphery of the base module 5 of the air disperser in the embodiment shown, the lower portion 51 and the upper portion 52 are connected to each other by means of a connecting element 56.

Figure 5:
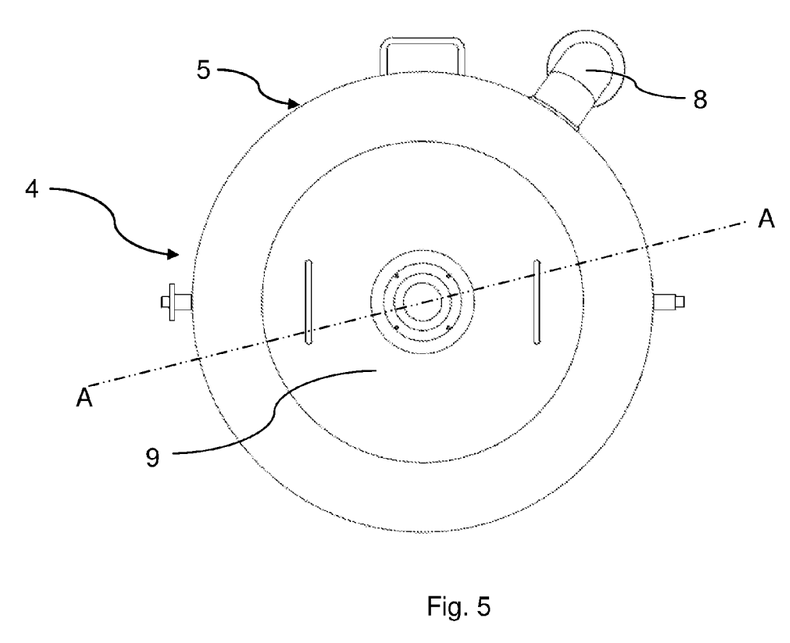
FIG. 5 is a top view of the air disperser of the first embodiment.

As shown in particular in FIGS. 5 and 6, the air disperser according to the embodiment shown comprises an insulating module 9 for releasable connection with the base module 5. Optionally, the insulating module 9 may be connected with the top plate 6 as well.

At one point along the periphery of the base module, a separate air inlet part 8 is connected to the base module 5. Although not shown in detail, the part 8 includes tubing for supply of drying air and is connected to the air inlet 81 either in the tangential or radial direction to the space 45.

In the embodiment shown in FIGS. 2 to 8, the guide vanes 7 are provided with an upper edge having a curved commute-like shape with a height at the inner radius which is smaller than the height at the outer radius. Other shapes are however conceivable.

In this embodiment, the top of space 45 is closed by a separate top plate 6. The top plate 6, which is optionally a two-part top plate, is connected to the base module by suitable securing means, here bolted to the base module 5, but other releasable connections to the base module 5 are conceivable as well. Also in this embodiment, the top plate 6 has a shape corresponding to the upper edge of the guide vanes 7. Towards the outer edge of the top plate 6 abuts against a stepped portion of the upper portion 52 of the base module 5 via a sealing 57.

Regardless of the shape of the top plate, it may form the positive engagement in the axial direction y, preventing movement of the framework constituted by the set of guide vanes and fixating device.

Figure 8:
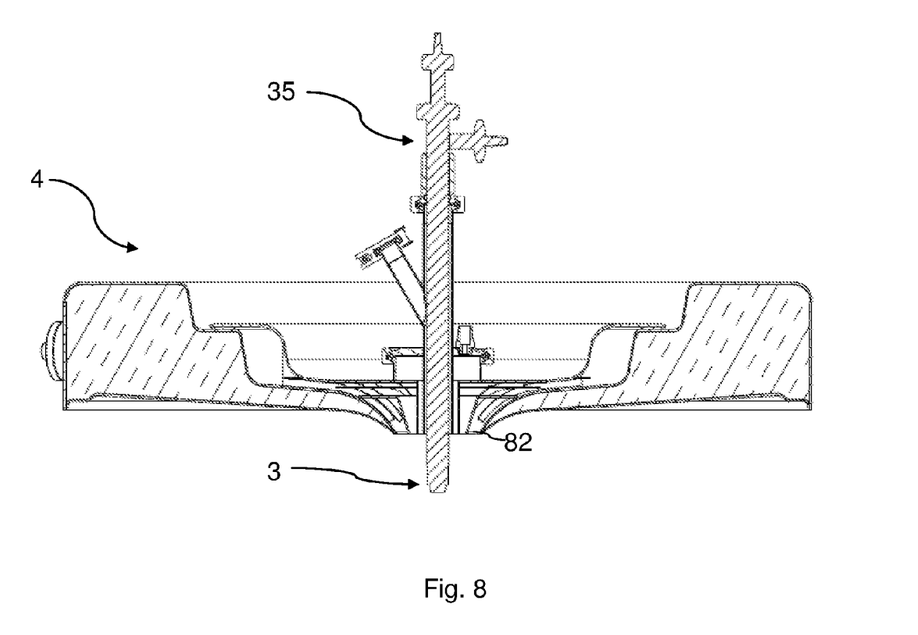
FIG. 8 shows a schematic cross-sectional view of a further embodiment of the air disperser according to the invention.

In FIG. 8, a nozzle lance generally designated 35 of a kind known per se has been inserted to protrude through the air disperser at the air outlet 82. Atomizing means 3 thus provide for atomization of a liquid feed (not shown) during operation of the spray drying apparatus.

As to materials of the parts of the air disperser and the manner of manufacturing, the guide vanes may be made from any suitable material, for instance a metal material, typically steel, and formed by laser cutting. Markings indicating the position in the framework including the set of guide vanes and the fixating device may be provided by laser cutting as well. Other materials that are conceivable are other metal materials or composites, but polymers and ceramic materials may be utilised using manufacturing techniques such as injection moulding, die-casting etc.

Manufacture of components of the air disperser according to the invention will now be described in detail with particular reference to the embodiments of the base module 5 and the top plate 6.

As is described in the above, the air disperser according to the invention comprises a number of components, and at least some of the components are formed by precision metal forming. Precision metal forming requires investment in manufacturing equipment including tools and machinery.

In the embodiment shown, the components include at least the bottom and outer wall of the space 45 in that the bottom and outer wall of the space 45 are provided by the base module 5 formed as a double-walled unit comprising the lower portion 51 and the upper portion 52. The bottom and outer wall of the space 45 are formed by the upper portion 52, and both of the lower portion 51 and the upper portion 52 are formed by precision metal forming.

In the present embodiment, each of the lower portion 51 and the upper portion 52 is formed by metal spinning. It is conceivable to form at least the upper portion 52 of two sections, each formed by metal spinning and subsequently joined to each other, for instance by welding.

As such, metal spinning is a known process for obtaining a symmetric three-dimensional element from a disk-shaped blank.

Virtually any ductile metal may be formed, from aluminum or stainless steel, to high-strength, high-temperature alloys. The diameter and depth of formed parts are limited by the size of the equipment available. The spinning process itself is relatively simple. A formed block is mounted in the drive section of a lathe. A pre-sized metal disk is then clamped against the block by a pressure pad, which is attached to the tailstock. The block and workpiece are then rotated together at high speeds. A localized force is then applied to the workpiece to cause it to flow over the block. The force is usually applied via various levered tools. Simple workpieces are just removed from the block, but more complex shapes may require a multi-piece block. The final diameter of the workpiece is always less than the starting diameter. Spinning tools can be made of hardened steel for using with aluminium or solid brass for spinning stainless steel or mild steel. Some metal spinning tools are allowed to spin on bearings during the forming process. This reduces friction and heating of the tool, extending tool life and improving surface finish. Rotating tools may also be coated with thin film of ceramic to prolong tool life. Rotating tools are commonly used during CNC metal spinning operations. Commercially, rollers mounted on the end of levers are generally used to form the material down to the mandrel in both hand spinning and CNC metal spinning. Rollers vary in diameter and thickness depending on the intended use. The wider the roller the smoother the surface of the spinning; the thinner rollers can be used to form smaller radii. Cutting of the metal is done by hand held cutters, often foot long hollow bars with tool steel shaped/sharpened files attached. In CNC applications, carbide or tool steel cut-off tools are used. The mandrel does not incur excessive forces, as found in other metalworking processes, so it can in principle be made from any material, but for hard materials or high volume use, the mandrel is usually made of metal.

Also in the embodiment shown, the lower portion 51 and the upper portion 52 are connected to each other by means of at least one connecting element 56, which may be formed as a cut metal plate shaped to the appropriate curvature.

Other components provided by precision metal spinning include in the embodiment shown the top, and the top is provided by a top plate 6, which in a not-shown embodiment is a two-part top plate. Also the top plate 6 is here formed by metal spinning.

The diameter of the base module 5 lies in the range 0.3 to 3 m, preferably 0.5 to 1.5 m.

The remaining parts of a spray drying apparatus into which an air disperser according to the invention is adapted to be built into are not shown. These parts could for instance correspond to those shown in FIG. 1 designating the prior art. In one particular field of use of the air disperser according to the present invention, the lower portion 51 of the base module is adapted to form the ceiling of the drying chamber of a spray drying apparatus.

The manner of assembling the air disperser may in principle be chosen freely, as long as they fulfil the demands posed.

The invention should not be regarded as being limited to the embodiment shown and described in the above but various modifications and combinations of features may be carried out without departing from the scope of the following claims.

The invention claimed is:

1. An air disperser for a spray drying apparatus, comprising a number of components including a top, a bottom, and an outer circumferential wall forming a space defined within an inner radius and an outer radius and having an air inlet, a set of guide vanes, and an air outlet at said inner radius adapted to be positioned above an atomizing feed outlet wherein the bottom and outer wall of said space are provided by a base module formed as a double-walled unit comprising a lower portion and an upper portion, wherein each of the lower portion and the upper portion is formed by metal spinning, and wherein the lower portion is rotationally symmetric about the air outlet, and wherein the upper portion is rotationally symmetric about the air outlet.

2. An air disperser according to claim 1, wherein the lower portion and the upper portion are connected to each other by means of at least one connecting element.

3. An air disperser according to claim 2, wherein the at least one connecting element is formed as a metal plate formed to an appropriate curvature.

4. An air disperser according to claim 1, wherein the top is provided by a top plate.

5. An air disperser according to claim 4, wherein said top plate is formed by metal spinning such that the top plate is rotationally symmetric.

6. An air disperser according to claim 4, wherein the top plate closing off said space is releasably connected to the base module.

7. An air disperser according to claim 6, wherein the top plate has a shape corresponding to an upper edge of the guide vanes of said set of guide vanes in part or in full.

8. An air disperser according to claim 1, wherein the diameter of said base module lies in a range of 0.3 to 3 m.

9. An air disperser according to claim 8, wherein the diameter of said base module lies in a range of 0.5 to 1.5 m.

10. An air disperser according to claim 4, wherein the top plate is rotationally symmetric about the air outlet.

11. An air disperser according to claim 1, wherein the guide vanes of said set of guide vanes are provided with an upper edge having a curved cornute-like shape with a height at the inner radius which is smaller than the height at the outer radius.

12. An air disperser according to claim 1, wherein the lower portion of the base module is adapted to form a ceiling of a drying chamber of a spray drying apparatus.

13. A method for improving the flow of drying air in a spray drying apparatus, the method comprising:
   providing an air disperser with a number of components including a top, a bottom, and an outer circumferential wall, an air inlet, a set of guide vanes, and an air outlet, and
   connecting said components to each other,
   wherein providing at least the bottom and the outer circumferential wall is carried out by forming a base module of a lower portion and an upper portion by metal spinning, and wherein the base module is double-walled, and wherein the lower portion is rotationally symmetric about the air outlet, and wherein the upper portion is rotationally symmetric about the air outlet.

14. The method of claim 13, wherein the upper portion is formed as two sections that are subsequently joined.

15. The method of claim 13, further comprising connecting the lower portion and the upper portion.

16. The method of claim 15, further comprising providing a connecting element and connecting the connecting element to the lower portion and the upper portion.

* * * * *